United States Patent Office 2,772,256
Patented Nov. 27, 1956

2,772,256
PROCESS FOR POLYMERIZING VINYL CHLORIDE

Michael A. Manganelli, Springfield, Mass., assignor to Monsanto Chemical Company, St. Louis, Mo., a corporation of Delaware No Drawing. Application August 13, 1953,
Serial No. 374,123

10 Claims. (Cl. 260—92.8)

This invention relates to a process for the polymerization of vinyl chloride. More particularly, this invention relates to a process for preparing granular polyvinyl chloride that can be rapidly blended with suitable plasticizers.

Polyvinyl chloride is used as a raw material in the preparation of a wide variety of useful articles. It is conventional practice to prepare polyvinyl chloride by a suspension polymerization process, the vinyl chloride being held in suspension by means of a heteropolymer of vinyl acetate and maleic anhydride or maleic acid used alone or in conjunction with other conventional suspending agents. However, when polyvinyl chloride is prepared in this manner using such conventional suspending agents, the polymer is recovered in the form of relatively fine granules having a substantially impervious surface. Such granular polymers are comparatively dense and tend to blend with plasticizers at a slow rate, from 5 to 10 minutes generally being required for blending operations. It has been recognized that porous granular polyvinyl chloride can be blended with plasticizers at a much more rapid rate but, heretofore, it has not been possible to prepare porous granular polyvinyl chloride by a suspension polymerization process when using a heteropolymer of vinyl acetate and maleic anhydride or maleic acid as a suspending agent.

Accordingly, an object of the present invention is the provision of a process for the preparation of electrical grade polyvinyl chloride.

Another object is the provision of a process for the preparation of granular polyvinyl chloride that can be rapidly blended with plasticizers.

A further object is the provision of a suspension polymerization process for the preparation of porous granular polyvinyl chloride wherein a heteropolymer of vinyl acetate and maleic acid or maleic anhydride is used as the suspending agent.

These and other objects are attained by polymerizing vinyl chloride in aqueous suspension in the presence of a polymerization catalyst, a heteropolymer of vinyl acetate and maleic acid or maleic anhydride and an ethylene oxide condensate of a saturated fatty acid mono-ester of ethylene glycol or glycerol, wherein the fatty acid residue contains from 12 to 24 carbon atoms and wherein the molar ratio of ethylene oxide to mono-ester is from 5:1 to 15:1.

Surprisingly, the granules of polyvinyl chloride prepared by this process have a porous structure and, as a result, can be blended with plasticizers at a rapid rate (e. g. less than 4 minutes). Further, the plasticized polyvinyl chloride is a substantially homogeneous composition and only a relatively small percentage of unplasticized polyvinyl chloride particles are present.

The following examples are given in illustration and are not intended as limitations on the scope of this invention. Where parts are mentioned, they are parts by weight.

EXAMPLE I

Prepare seven batches of polyvinyl chloride (denominated 1–7 in Table I) by a suspension polymerization process. For each batch use 100 parts of monomeric vinyl chloride suspended in 150 parts of water containing 0.25 part of lauroyl peroxide, 0.15 part of a heteropolymer of vinyl acetate and maleic anhydride and 0.2 part of the ethylene oxide condensate set forth in Table I. The heteropolymer is prepared by copolymerizing 1 part of vinyl acetate and 1 part of maleic anhydride in solution in 400 parts of benzene in the presence of 0.4 part of benzoyl peroxide at a temperature of 50° C. for 70 hours. In order to form polyvinyl chloride, agitate each batch at a temperature of about 50° C. for a period of about 15 hours. At the end of this time recover the polymer by filtration, wash with water and dry. The granular polymers of the different batches will have varying degrees of porosity, the batches comprising granular polyvinyl chloride having a high degree of porosity, capable of blending with plasticizer within less than 4 minutes when blended in accordance with the following test.

In order to test for porosity, blend a plurality of samples of polyvinyl chloride from each batch with dioctyl phthalate in a Reed mixer at a mixer temperature of about 250° F., each sample consisting of 100 parts of granular polyvinyl chloride and 50 parts of dioctyl phthalate. In conducting the test, add the granular polyvinyl chloride to the mixer in the absence of plasticizer and malaxate until the polymer is heated to about the temperature of the mixer. Then add the plasticizer. At 15 second intervals withdraw a small sample of the material and press the sample against a sheet of filter paper with a spatula. When an oil-spot is no longer formed on the filter paper the plasticizer has been substantially completely absorbed by the polymer. If an oil-spot is still formed on the filter paper after an elapsed time of 4½ minutes, discontinue the test as the results are unsatisfactory. At the end of the test the plasticized polyvinyl chloride will still be in granular condition and will feel "dry" to the touch.

In addition, test samples of the polyvinyl chloride from each batch for colloidability (i. e. homogeneity). In order to do this, malaxate a mixture of 100 parts of polyvinyl chloride, 50 parts of dioctyl phathalate and 2 parts of glycerol mono-oleate (stabilizer) for 5 minutes on a roll mill heated at 140° C. Form this composition into sheets about 0.075" thick by pressing at 160° C. for 2 minutes in a flash mold using 1000 p. s. i. pressure. Measure colloidability by visually counting the number of "fish-eyes" (unplasticized particles of polyvinyl chloride) present in a given area of sheet. The sheets containing the greatest number of fish-eyes per unit of area have the poorest colloidability. Sheets prepared from batches 4 and 7 will contain a comparatively small number of fish-eyes per unit of area while the sheets prepared from batch 3 will be substantially free from fish-eyes.

The ethylene oxide condensate used for each batch and the results of the foregoing tests are summarized in the following table.

Table I

| Batch | Ethylene Oxide Condensate | Mol ratio of EO to Mono-ester [1] | Colloid-ability | Average blending time (Min.) |
|---|---|---|---|---|
| 1 | Ethylene oxide condensate of ethylene glycol monostearate. | 20:1 | poor | over 4½. |
| 2 | Ethylene oxide condensate of glycerol monosterate. | 1:1 | do | Do. |
| 3 | do | 7:1 | excellent | 3 to 3½. |
| 4 | do | 10:1 | good | 3½ to 4. |
| 5 | do | 13:1 | fair | Do. |
| 6 | do | 20:1 | poor | over 4½. |
| 7 | Ethylene oxide condensate of ethylene glycol monostearate. | 10:1 | good | 3½ to 4. |

[1] The molar ratio of ethylene oxide radical (EO) to mono-ester radical in the ethylene oxide condensate of the mono-ester.

From the foregoing table it is seen that a satisfactory blending time of less than 4 minutes was obtained only in the case of batches 3, 4, 5 and 7 and that the blending time for batch 3 was appreciably lower than the blending time for the other satisfactory batches. Further, it is to be noted that batch 3 had excellent colloidability coupled with the most rapid blending rate whereas the other satisfactory batches required a longer time for blending and did not possess such superior colloidability. The particle size of the granular polyvinyl chloride prepared from the various batches has not been set forth. When blending non-porous granular polyvinyl chloride with plasticizers, particle size is of particular importance, but when porous granular polyvinyl chloride is used, the size of the particles is not critical and need not be accurately controlled. However, it is to be noted in passing that at least 40% of the polyvinyl chloride of batches 1 through 7 will pass a 100 mesh screen.

Porous granular polyvinyl chloride is prepared in accordance with the present invention by a suspension polymerization process wherein the vinyl chloride is suspended in water by means of a mixture of a heteropolymer of vinyl acetate and maleic anhydride or maleic acid and an ethylene oxide condensate of a fatty acid mono-ester of glycerol or ethylene glycol.

The ethylene oxide condensates to be used in accordance with the present invention are the ethylene oxide condensates of mono-esters of fatty acids containing from 12 to 24 carbon atoms and ethylene glycol or glycerol. Porous granular polyvinyl chloride will not be obtained if the molar ratio of ethylene oxide to mono-ester is in excess of about 15 to 1 or less than about 5 to 1. The fatty acids that may be used to prepare the mono-esters are the lauric, tridecylic, myristic, palmitic, margaric, stearic, nondecylic, archidic, lignoceric, cerotic, etc. acids. Mixtures of ethylene oxide condensates of two or more such esters may be used if desired. Generally speaking, it is preferable to use an ethylene oxide condensate of a fatty acid mono-ester of glycerol and, of this class of materials, glycerol monostearate is preferred. When using an ethylene oxide condensate of glycerol monostearate, especially an ethylene oxide condensate containing less than 10 mols of ethylene oxide per mol of glycerol monostearate, the most rapid blending rate and the most satisfactory colloidability are obtained. It is preferable to use an ethylene oxide condensate containing from about 5 to 10 mols of ethylene oxide per mol of mono-ester when the fatty acid contains from 12 to 18 carbon atoms and to use a condensate containing from about 10 to 15 mols of ethylene oxide per mol of mono-ester when the fatty acid contains from 20 to 24 carbon atoms.

If porous granular polyvinyl chloride is to be obtained, from about 0.1 to about 0.3 part of ethylene oxide condensate should be used for each 100 parts of monomer. For best results, it is preferable to use about 0.2 part of ethylene oxide condensate per 100 parts of vinyl chloride.

In order to obtain porous granular polyvinyl chloride it is necessary to use the above-described ethylene oxide condensates in conjunction with a heteropolymer of vinyl acetate and maleic acid or maleic anhydride. If suspending agents other than such heteropolymers are used, the resultant polymers will not have the desired porous structure. The heteropolymers may be made by polymerizing mixtures of vinyl acetate and maleic anhydride or maleic acid in varying molar ratios, e. g. from 1:9 to 9:1. Usually, it is preferable to use maleic anhydride and to use a ratio of maleic anhydride to vinyl acetate that does not exceed 1:1. Heteropolymers of this nature possess substantial solubility in water without the use of compounds forming salts therewith. These suspending agents are well-known compounds and may be prepared in accordance with the process described in U. S. Patent No. 2,562,852 to M. Baer. From about 0.1 to 1.0 part of heteropolymer per 100 parts of monomer should be used.

In order to obtain a reasonably rapid polymerization rate, a suitable water-insoluble, oil-soluble polymerization catalyst should be used. Among the catalysts that may be used are peroxides such as lauroyl peroxide, benzoyl peroxide, ditertiary peroxide, acetyl peroxide, propionyl peroxide, toluyl peroxide, etc. Mixtures of two or more such catalysts may be used if desired. Preferably, from about 0.01 to about 1 part of catalyst per 100 parts of monomer should be used. With respect to the amount of water, it is possible to use from about 100 to 200 parts of water for each 100 parts of vinyl chloride with satisfactory results. Preferably, about 150 parts of water should be used for each 100 parts of monomer.

The porous granular polymers that can be prepared by the process of the present invention are the homopolymers of vinyl chloride. The polymers have excellent electrical resistance properties and are particularly useful as electrical insulating materials. When other ethylenically unsaturated monomers copolymerizable with vinyl chloride are present even in small amounts (e. g. 90 parts of vinyl chloride and 10 parts of vinyl acetate), the porous granular polymers of the present invention will not be obtained.

What is claimed is:

1. A process for preparing a porous granular polymer which comprises polymerizing 100 parts of vinyl chloride in suspension in from about 100 to 200 parts of water containing from about 0.01 to 1 part of a water-insoluble, oil soluble polymerization catalyst and a suspending medium consisting of from about 0.1 to 1 part of a heteropolymer of vinyl acetate and a compound taken from the group consisting of maleic acid and maleic anhydride and from about 0.1 to about 0.3 part of an ethylene oxide condensate of a saturated fatty acid mono-ester of a compound taken from the group consisting of ethylene glycol and glycerol, the fatty acid residue of said mono-ester containing from 12 to 24 carbon atoms, said condensate having a molar ratio of ethylene oxide to fatty acid mono-ester of from about 5:1 to about 15:1.

2. A process as in claim 1 wherein the heteropolymer is a heteropolymer of equimolar proportions of vinyl acetate and maleic anhydride.

3. A process as in claim 1 wherein about 0.2 part of ethylene oxide condensate is used for each 100 parts of vinyl chloride.

4. A process as in claim 1 wherein the ethylene oxide condensate is an ethylene oxide condensate of a mono-fatty acid ester of ethylene glycol.

5. A process as in claim 4 wherein the ethylene oxide condensate is an ethylene oxide condensate of ethylene glycol monostearate.

6. A process as in claim 1 wherein the ethylene oxide condensate is an ethylene oxide condensate of a fatty acid monoester of glycerol.

7. A process as in claim 6 wherein the ethylene oxide condensate is an ethylene oxide condensate of glycerol monostearate.

8. A process as in claim 7 wherein the ethylene oxide condensate of glycerol monostearate contains about 7 mols of ethylene oxide per mol of glycerol monostearate.

9. A process for preparing a porous granular polymer which comprises polymerizing 100 parts of vinyl chloride in suspension in about 150 parts of water containing about 0.25 part of a water-insoluble, oil soluble polymerization catalyst, about 0.15 part of a heteropolymer of equimolar portions of vinyl acetate and maleic anhydride and about 0.2 part of an ethylene oxide condensate of glycerol monostearate, said condensate containing about 7 mols of ethylene oxide per mol of glycerol monostearate.

10. A process for preparing a porous granular polymer which comprises polymerizing 100 parts of vinyl chloride in suspension in about 150 parts of water containing about 0.01 to 1 part of a water-insoluble, oil-soluble polymerization catalyst and a suspending medium consisting of from about 0.1 to 1 part of a heteropolymer of vinyl acetate and a compound taken from the group consisting of maleic acid and maleic anhydride and from about 0.1 to 0.3 part of an ethylene oxide condensate of a saturated fatty acid mono-ester of a compound taken from the group consisting of ethylene glycol and glycerol, the fatty acid residue of said mono-ester containing from 12 to 24 carbon atoms, said condensate having a molar ratio of ethylene oxide to fatty acid mono-ester of from about 5:1 to 15:1.

References Cited in the file of this patent

UNITED STATES PATENTS 2,528,469     Condo et al. _____ Oct. 31, 1950